UNITED STATES PATENT OFFICE.

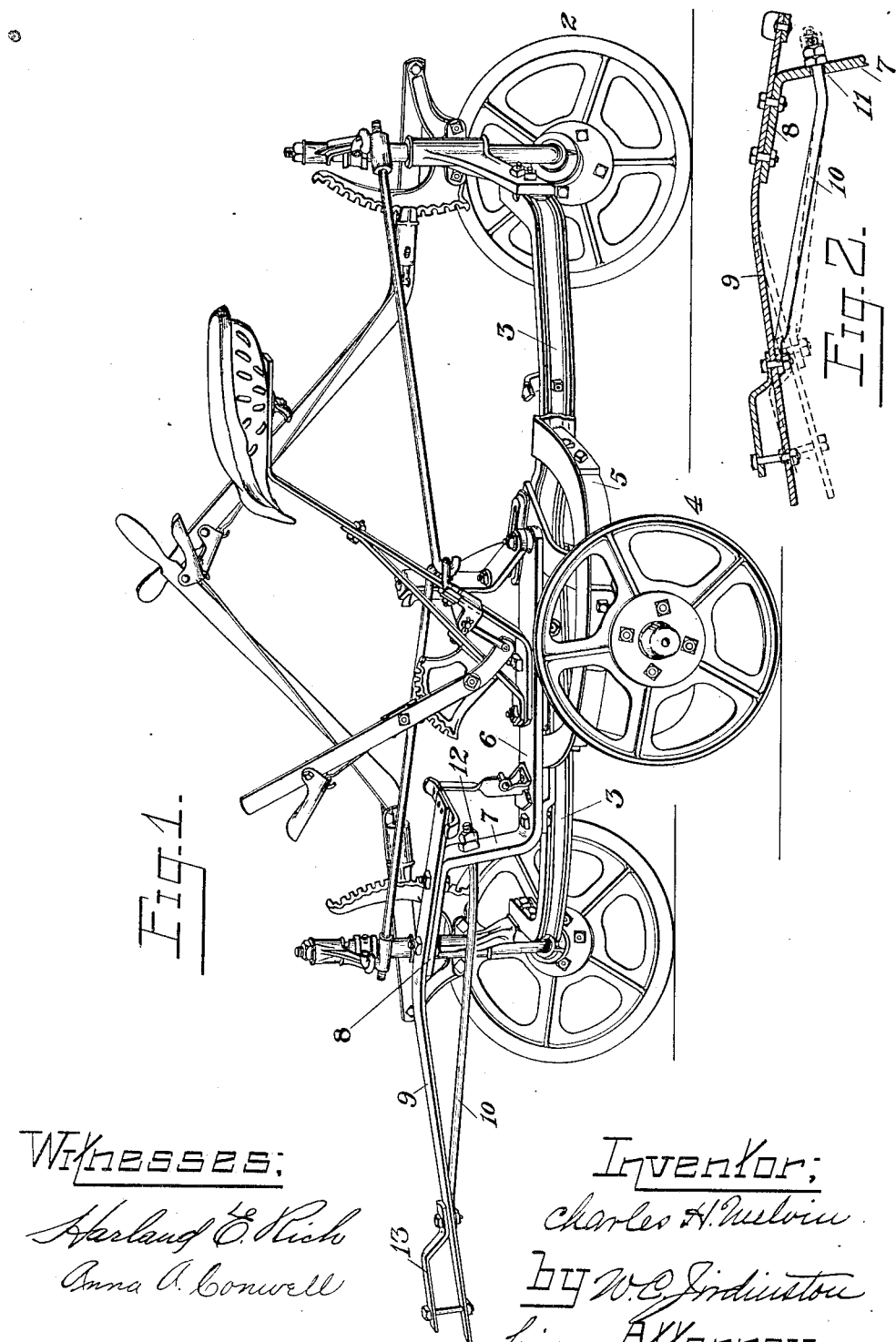

CHARLES H. MELVIN, OF MOLINE, ILLINOIS, ASSIGNOR TO DEERE & COMPANY, OF MOLINE, ILLINOIS, A CORPORATION OF ILLINOIS.

DRAFT DEVICE.

1,085,148.  Specification of Letters Patent.  Patented Jan. 27, 1914.

Application filed May 18, 1911. Serial No. 628,122.

*To all whom it may concern:*

Be it known that I, CHARLES H. MELVIN, a citizen of the United States, residing at Moline, in the county of Rock Island and State of Illinois, have invented certain new and useful Improvements in Draft Devices, of which the following is a specification, reference being had therein to the accompanying drawing.

My invention relates to a draft mechanism, particularly as applied to agricultural machinery, such as wheeled plows or the like, to which the draft mechanism is more or less rigidly attached.

The object of my invention is to strengthen such draft mechanism against certain strains, and to provide flexibility under conditions that otherwise would be detrimental to the efficiency of the machine or implement to which the draft mechanism might be attached.

Referring to the drawings in which similar numerals of reference indicate identical parts—Figure 1 is a side view in perspective of a sulky-plow showing my invention as applied thereon, and Fig. 2 is a longitudinal detail section.

The type of plow upon which I have shown my device is known as a reversible disk-plow and is more fully illustrated and described in my Patent No. 979,019, December 20, 1910, the description herein being sufficient to show the application and utility of my device, which may however be as readily applied to other types of wheeled-plows.

1 and 2 are furrow-wheels attached to the front and rear of a main beam 3.

4 is a land-wheel mounted on a suitable bearing on a bracket 5 extending laterally landward of the beam 3 and rigidly attached thereto.

The tongue of the implement is secured to the plow in any suitable manner, and consists of a horizontal portion 6 having, preferably integral therewith, a portion 7 bent upwardly and having a portion 8 extending forwardly, to which is firmly secured a tongue-plate 9 which preferably has a slight downward inclination forwardly, and also extends rearwardly of its attachment to the tongue, and a foot-rest secured on the end of the rearward extension.

Secured to the forward under-side of the tongue-plate 9 is a rod 10 which projects rearward and through an aperture 11, in the upwardly bent portion 8 of the tongue 6, in which it has a free rearward movement when the tongue-plate bends downwardly, and forward movement being limited by nuts 12 forming a stop on the end of the rod 10 which is threaded to receive them, the end of the rod being threaded a sufficient distance to permit adjustment of the rod 10, as will be readily understood.

A clevis 13 is shown secured on the upper side of the tongue-plate 10, but it can be secured on the under side of the plate 10 when necessary.

In plows of this class the greater part of the weight of the plow is rearward of the landside-wheel, this weight reinforced by the weight of the driver, holds the rear furrow-wheel in proper relation with a furrow unless the force of the draft on the tongue should be downward, in which event the front furrow-wheel will be forced into the ground, changing the proper balance of the plow and making it possible for the rear of the implement to rise from the ground; this latter condition is more liable to occur, particularly when plowing ground of an uneven or knolly surface. I have found that the use of my invention maintains the proper balance of the plow under such antagonistic conditions, for the tongue-plate is flexible downwardly only from its normal position by the force of the draft, and being of spring material, it quickly returns to its normal position when the draft becomes level and beyond which it cannot move upwardly except with the tongue. If the tongue-plate is allowed to flex upwardly, as it does downwardly, and knolls or ridges are encountered while plowing, the suction of the plow will cause a deeper entrance into the ground, the proper balance will be disturbed, and the furrow will be uneven and imperfect, with an absence of upward flexibility in the tongue-plate, however, the plow will follow the lead of an upward draft, and the proper balance of the plow is maintained; it will be at once apparent that my device renders a plow more effective in operation and the furrows are continuous as to depth and direction.

What I claim is—

1. A sulky-plow, having in combination, a plow supporting frame, a plurality of wheels supporting the frame, a tongue on the frame, a tongue-plate secured on the tongue and having draft means thereon, and means connected to the tongue-plate, and rearwardly and adjustably to the tongue to prevent upward movement of the tongue-plate independently of the tongue.

2. A sulky-plow, having in combination, a plow supporting frame, a plurality of wheels supporting the frame, a tongue on the frame, a flexible tongue-plate secured to the tongue and having draft connections thereon, and means connected forwardly to the tongue-plate adjacent said draft connections and rearwardly to the tongue to prevent upward movement of the tongue-plate independently of the tongue.

3. A sulky-plow, having in combination, a plow supporting frame, a plurality of wheels supporting the frame, a tongue on the frame, a flexible tongue-plate secured on the tongue and downwardly flexible, and means connecting the forward portion of the tongue-plate rearwardly and adjustably with the tongue to limit upward flexibility of the tongue-plate.

4. A sulky-plow, having in combination, a plow supporting frame, a landside-wheel and front and rear furrow-wheels supporting the frame, a tongue on the frame having an upwardly extending portion, a tongue-plate on the tongue and an adjustable connection between the tongue-plate and the upwardly extending portion of the tongue.

5. A sulky-plow, having in combination, a plow supporting frame, a landside-wheel and front and rear furrow-wheels supporting the frame, a tongue on the frame having an upwardly extending portion, a tongue-plate on the tongue, and a rod connected to the tongue-plate and loosely connected with the upwardly extending portion of the tongue.

6. A sulky-plow, having in combination, a plow supporting frame, a landside-wheel and front and rear furrow-wheels supporting the frame, a tongue having an upwardly extending portion, an aperture in the upward portion, a tongue-plate on the tongue, and a rod connected to the tongue-plate and projecting through the aperture in the upwardly extending portion of the tongue.

7. A sulky-plow, having in combination, a plow supporting frame, a landside-wheel and front and rear furrow-wheels supporting the frame, a tongue on the frame having an upwardly extending portion, an aperture in the upwardly extending portion, a tongue-plate on the tongue, a rod connected forwardly to the tongue-plate and projecting through the aperture in the upwardly extending portion and adapted to move rearwardly, and a stop on the rod to limit its forward movement.

8. A sulky-plow, having in combination, a plow supporting frame, a landside-wheel and front and rear furrow-wheels supporting the frame, and a tongue on the frame, a flexible tongue-plate on the tongue and rigid against an upward draft and flexible when the force of the draft is downward.

9. A sulky-plow, having in combination, a plow supporting frame, a landside-wheel and front and rear furrow-wheels supporting the frame, a tongue on the frame, a flexible tongue-plate rigidly secured on the tongue, and an adjustable connection between the tongue-plate and the tongue to limit the upward flexibility of the tongue-plate.

In testimony whereof I affix my signature, in presence of two witnesses.

CHARLES H. MELVIN.

Witnesses:
ANNA A. CONWELL,
HARLAND E. RICH.

Copies of this patent may be obtained for five cents each, by addressing the "Commissioner of Patents, Washington, D. C."